United States Patent [19]

Gottschall et al.

[11] 3,996,772
[45] Dec. 14, 1976

[54] METHOD AND DEVICE FOR THE ELECTRONIC CONTROL OF KNITTING MACHINES KNITTING PATTERN GOODS

[75] Inventors: Gernot Gottschall, Boblingen; Heinrich Elsässer, Stuttgart, both of Germany

[73] Assignee: Firma Franz Morat GmbH, Stuttgart, Germany

[22] Filed: Feb. 27, 1975

[21] Appl. No.: 553,477

Related U.S. Application Data

[63] Continuation of Ser. No. 425,867, Dec. 18, 1973, which is a continuation of Ser. No. 143,135, May 13, 1971, abandoned.

[30] Foreign Application Priority Data

May 30, 1970 Germany ............................ 2026584

[52] U.S. Cl. ............................ 66/154 A; 66/50 R
[51] Int. Cl.² ......................................... D04B 15/78
[58] Field of Search ............. 66/50 R, 50 B, 25, 75, 66/154 A, 155; 250/233

[56] References Cited

UNITED STATES PATENTS

| | | | |
|---|---|---|---|
| 2,944,157 | 7/1960 | Mc Auslan et al. | 250/233 |
| 3,312,828 | 4/1967 | Wingate | 250/233 X |
| 3,446,037 | 5/1969 | Sutton | 66/25 |
| 3,470,714 | 10/1969 | Corbaz | 66/50 R |
| 3,472,287 | 10/1969 | Ribler | 66/154 A |
| 3,786,655 | 1/1974 | Krause | 66/154 A |
| 3,807,196 | 4/1974 | Gottsching | 66/50 R |

FOREIGN PATENTS OR APPLICATIONS

| | | | |
|---|---|---|---|
| 2,007,515 | 9/1970 | Germany | 66/50 R |
| 1,165,368 | 9/1969 | United Kingdom | 66/154 A |

*Primary Examiner*—Mervin Stein
*Assistant Examiner*—A. M. Falik

[57] ABSTRACT

A knitting machine in which electrical signals are employed during operational strokes for selecting particular needles for operation in accordance with a pattern and in which operational pulse modes are generated having electrical signals displaced in phase from the signals of other pulse modes so that the signals appear in other operational strokes.

8 Claims, 7 Drawing Figures

INVENTORS:
GERNOT GOTTSCHALL + HEINRICH ELSÄSSER

INVENTORS:

GERNOT GOTTSCHALL + HEINRICH ELSÄSSER
BY:
John Legley
ATTORNEY

METHOD AND DEVICE FOR THE ELECTRONIC CONTROL OF KNITTING MACHINES KNITTING PATTERN GOODS

This is a continuation of application Ser. No. 425,867, filed Dec. 18, 1973 which is a continuation of application Ser. No. 143,135, now abandoned.

BACKGROUND OF THE INVENTION

There are essentially two methods for the so-called electronic control of machines. In both methods, electrical control signals are fed to the mchine and these signals are received through optical, magnetic, electronic, or mechanical scanning of the program carrier.

In one method, which can be used particularly in connection with machines for making picture patterns, such as, for example, knitting machines, weaving machines, printing machines, machines for making mosaic pictures and the like, the program carrier consists of a two-color or multi-colored drawing which can also be present herein the form of a grid or raster pattern or which consists of the image of this drawing on the screen of a television tube which is a part of an optical-electrical picture storage unit. The design to be produced by the machine is in these cases stored in the program carrier in an analog, visually recognizable form.

In the other known method, which is suitable for the electrical control of machines of all kinds, the program carrier consists of a control strip having optically-magnetically, or mechanically scannable markings, on which the control signals, to be fed into the machine, are stored in a visually nonrecognizable order and in digital form. The same applies to the case where the storage or memory unit of the data processing installation is used as program carrier.

The methods mentioned are preferably suited for the electronic control of complicated functional procedures and have accordingly comprehensive program carriers. On the other hand, they are much too expensive for the control of relatively simple functional procedures, for example, in textile machine technology, especially in circular knitting machine technology. It is therefore still customary today to use, in addition to electronic control devices the convention mechanical design devices, such as design wheels, trip cams, switching chain apparatuses, and the like, when small design guides are to be made. However this has the disadvantage that either two different machines are needed or that the electronically controllable machines must additionally be equipped with means for mechanical control.

As illustrated in U.S. Pat. No. 3,680,331, it is frequently desirable in machines controlled by control strips, in order to avoid excessively long and therefore expensive control strips, from time to time to interrupt the control commanded by this strip and instead to switch to a simpler type of control. The reason for this is that the knitware to be made alternately can have complicated connection and/or color designs and areas of simple knitting, so that small, complicated guides alternate with large-area, simple guides, whereby the production of a separate program carrier is not worthwhile for simple guides.

It is understood that by "guide" or "period" what is meant is the regular, periodic recurrence of the various equivalent points of the material to be produced, for example, knitware, or that part of the special functional procedure of the machine which is constantly repeated. Simple guides can extend over a few stitches in a stitch course in the case of knitware. For example, if it is desired to make two white and two red stitches alternating in steady repetition, then it is necessary within one period of four stitches or four work cycles of the machine to supply two control signals to the system that handles the white color and to the system that handles the red color. If the guide on the other hand is to consist for example of two red stitches between three white stitches, then within a period of eight stitches or eight work cycles of the machine, it is necessary to feed six control signals to the white system and two control system in a certain order. Until now, this has been accomplished through the corresponding programming of the program carrier or by means of mechanical expedients, whereby a separate control track of the control strip or a corresponding mechanical control device is assigned to each work station of the machine.

It is an object of this invention to avoid the prior art disadvantages and creating a method and device by means of which it will be possible to feed into an electronically controllable machine the electrical control signals necessary for the control of simple processes without the use of a specially made program carrier.

SUMMARY OF THE INVENTION

The object of this invention is carried out on the basis of a method for the electrical control of the operation of a periodically working machine, whose work stations are fed, each, $n \leq N$ control impulses within every period T consisting of N successive work cycles, whereby N and $n$ are integral numbers. The invention consists in the fact that N pulse modes are generated and each such pulse mode has per period T one pulse with a pulse duration of preferably $D = T/N$ and the pulses of the successive modes are shifted with respect to each other in terms of time and that every work station is fed all pulses of at least one pulse mode so that a number of $n$ pulses will become effective within a period T.

This invention offers the advantage that when the machine operates according to a simple functional procedure it is not necessary to make any control strips, design drawings, or the like. Instead, it is enough to determine at what moment during one period control signals will have to appear and accordingly to feed the signals of one, several, or all pulse modes to one, several, or all work stations. If in the circular knitting machine, for example, guide widths of eight stitches are to be worked and if therefore eight types of impulses, shifted in terms of time are generated, then every selection device is fed certain ones of the eight impulse types in such a manner that the connection or color guide will be formed in every system in the manner provided for. By this invention it is possible, in any system, within the period of eight work cycles to select all eight, only a few, or not needles at all for knitting.

Another essential advantage of this ivnention consists in the fact that all work stations of the machine, for example, the 24, 36, or 48 systems of a circular knitting machine, can be commanded simultaneously and in various ways by th few pulse modes produced, that is, for a guide width of N stitches it would be enough to have N pulse sequences in order to control all existing systems and in order to make all imaginable guides.

The pulse modes for example can be generated electrically-optically-mechanically or electromagnetically-mechanically by scanning suitable bodies.

The device for implementing the method according to this invention is characterized by $k = N/2$ scanning devices which are so arranged in a staggered fashion relative to a marking carrier which moves past them and which has markings at constant intervals so that during the scanning of the marking carrier they will generate $k$ pulse modes shifted with respect to each other in terms of time. The device of this invention is further characterized by a circuit with N outputs for the derivation of the N pulse modes from the $k$ pulse modes. This circuit consists of logic switching members (i.e switching means) and is connected in after the scanning devices.

The marking carrier can be a disk which can be rotated with relation to the scanning devices and which has a series of markings consisting of roughly equally wide slits and bars in the direction of the circumference, whereby the scanning devices can be shifted toward each other along the row of markings by integral multiples of the $1/k$-widths of one marking width.

According to another embodiment of this invention, the marking carrier can be a rotatable disk with $k$ rows of markings consisting of roughly equally wide slits and bars in the direction of the circumference, whereby the $k$ marking rows in the direction of the circumference are shifted toward each other by integral multiples of the $1/k$-widths of one marking width and whereby the scanning devices are arranged in a row perpendicular to the marking rows. According to the first feature, the N pulse modes can be generated by using N/2 scanning devices and a single marking row so that this feature is distinguished by its special simplicity and cheapness.

According to one preferred further embodiment of this invention, it is possible to connect, between the circuit and the work places of the machine, a cross-bar distributor through which one can determine the number of the outputs of the circuit to be connected with the work places. If a knitting machine is to be controlled with different system intervals, then a corresponding tie-in of the lines of the cross-bar distributor may be provided for the additionally required relative time shift of the N pulse sequences.

The object and advantages of this invention will be understood by referring to the drawings wherein:

DESCRIPTION OF THE PREFERRED EMBODIMENTS

Figure 1:
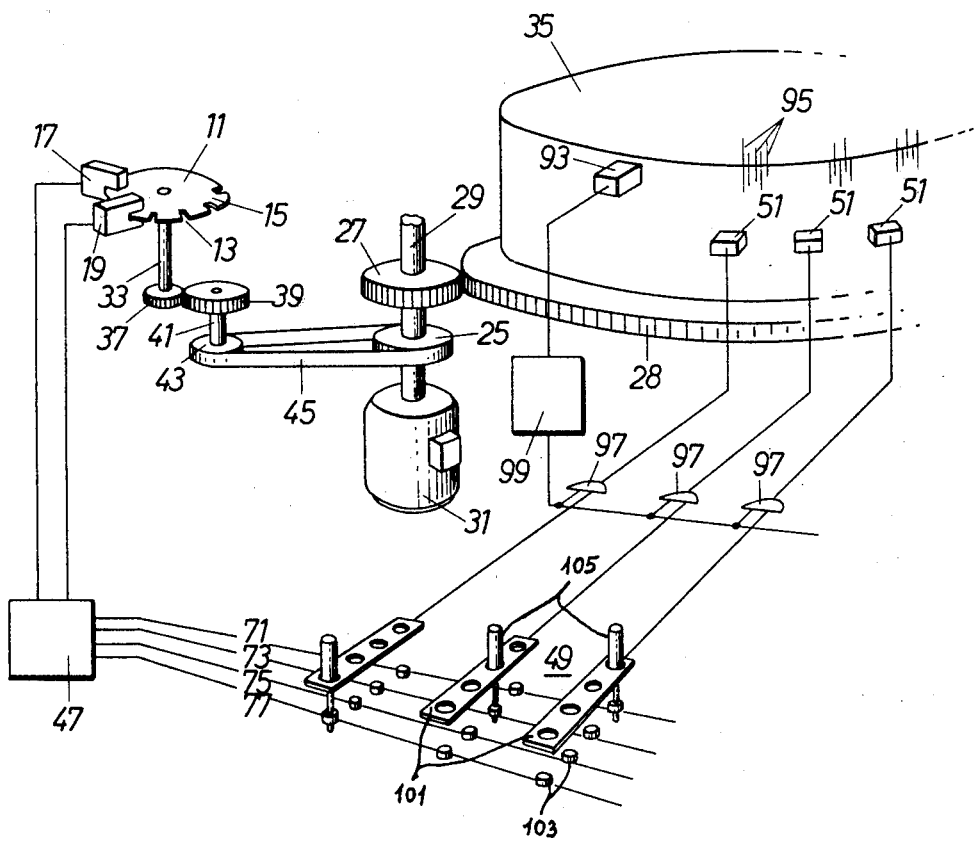
FIG. 1 illustrates a circular knitting machine with a device according to this invention for use in making small design guides.
Figure 2:
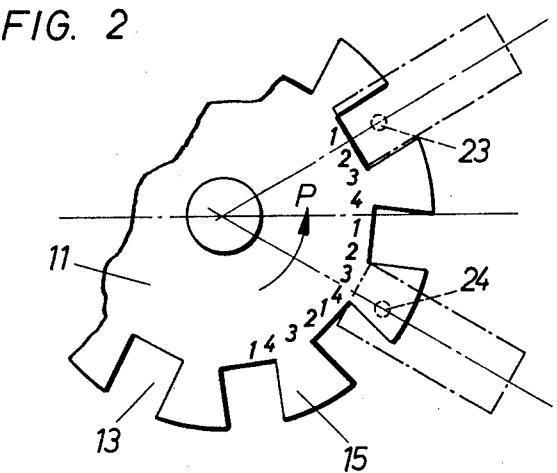
FIG. 2 is a top view of a part of the device shown in FIG. 1.
Figure 3:
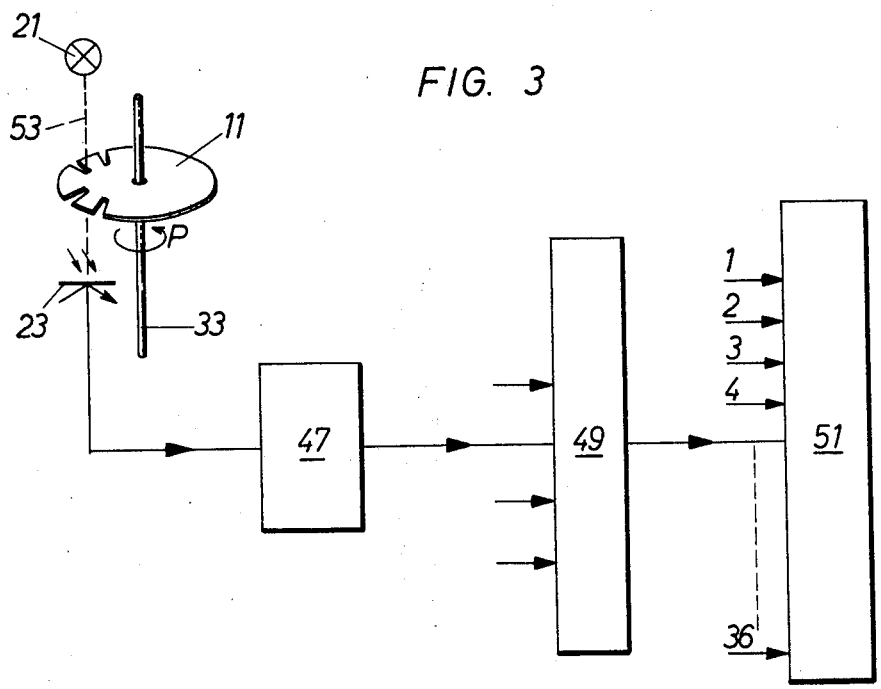
FIG. 3 is a block diagram of a circuit connected to the device according to this invention.

According to the embodiment shown in FIG. 1, the device according to this ivention has a rotatable disk 11 with markings along the edge consisting of equally spaced slits 13 and bars 15. The slits 13 and bars 15 are scanned by two scanning devices 17, 19 which are arranged next to each other and which, as shown in FIGS. 2, 3, consist of a light source 21 and of the photoelectric cells 23 or 24. Light source 21 and photoelectric cell 23 (respectively 24) are in each case arranged on various sides of the disk 11. Scanning devices 17, 19 are placed on a plate (not shown) which is attached to the fixed portion of the machine in such a manner that they can be adjusted with respect to each other and with respect to disk 11 as desired.

Disk 11 is attached to a rotatable shaft 33 which is positioned in a fixed part of the machine and which, at its lower part, has a gear wheel 37 which engages with a gear wheel 39. The gear wheel 39 sits on a shaft 41 which is likewise positioned rotatably in a fixed portion of the machine and which carries another gear wheel 43. This gear wheel 43 is driven via a free-from-play chain drive 45 and another gear wheel 25, sitting on drive shaft 29, by a motor 31 which, for example, can be a synchronous or stepping motor. By another gear wheel 27 which sits on drive shaft 29, motor 31 furthermore drives a gear wheel 28 which is attached to the needle cylinder 35 of a circular knitting machine. On the basis of these drive connections, disk 11 and needle cylinder 35 are turned synchronously with respect to each other. In place of the gear wheels 37, 39, 43 25, and 27, there may also be used rollers and in the chain of thechain drive 45 there may be used a belt drive, provided they permit no-slip drive.

With photoelectric cells 23, 24 of the scanning devices 17, 19, there is connected as shown in the block diagram of FIG. 3, a circuit which essentially contains an input logic 47 after which there may be connected a cross-bar distributor 49. The electromagnetic selection devices 51 of the circular knitting machine may be connected, for example, with the outputs of the input logic 47 or of the cross-bar distributor 49. In FIG. 3, a block of, for example, 36 such selection devices 51 is indicated.

The light beams 53, coming out of light sources 21, are focused upon the photoelectric cells 23, 24, by optical systems (not shown) in such a manner that a slit 13 or a bar 15 is in the path of the light beams depending upon the angle position of disk 11.

The interval between the photoelectric cell 23, 24 and the scanning devices 17, 19 is illustrated in FIG. 2. It is assumed here that the slits 13 and the bars 15, which are along the edge of disk 11, have roughly the same width in the direction of rotation of disk 11 and that every slit 13 and every bar 15 is visualized as being subdivided into two sections which are roughly equally wide in the direction of rotation, so that the slits 13 consist of slit sections 1, 2 and the bars 15 will consist of bar sections 3, 4 and in each case the sections 1, 2, 3, and 4 will come to lie next to each other in the same sequence. Under this assumption, the photoelectric cells 23, 24 are so arranged over disk 11 that when the disk 11 is in the angle position shown in FIG. 2, the photo cell 23 will scan the section 1 of one slit, while at the same time the other photoelectric cell 24 will scan the section 4 of a bar. When the disk 11 is rotated by the width of one of the sections 1 to 4 in the direction of arrow P the photoelectric cell 23 then scans the section 2 of the same slit, while the other photoelectric cell 24, on the other hand, scans the section 1 of the following slit. If the disk 11 is once again rotated further, in succession, by the width of one, slit or bar section, then the photoelectric cell 23 will in succession scan the sections 3, 4 of the following bar and the other photoelectric cell 24 will in succession scan the section 2 of the same slit or the section 3 of the following bar.

Figure 5:
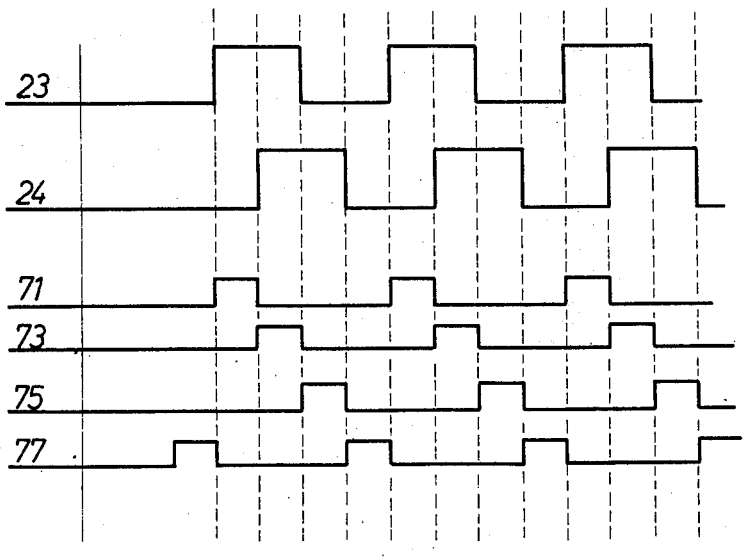
FIG. 5 illustrates the pulse forms of the pulses which appear at the outputs of the scanning devices according to FIG. 1 and at the output terminals of the part of the circuit shown in FIG. 4.

Photoelectric cells 23, 24 therefore give off pulses one after the other and the forms of these pulses are illustrated in the upper part of FIG. 5. The width of one pulse here corresponds to the width of one slit 13 while the width of a pause on the other hand corresponds to the width of one bar 15 of the disk 11.

In accordance with FIG. 5, the pulse sequences given off by the photoelectric cells are shifted towards each other in terms of time by one half pulse width.

Figure 4:
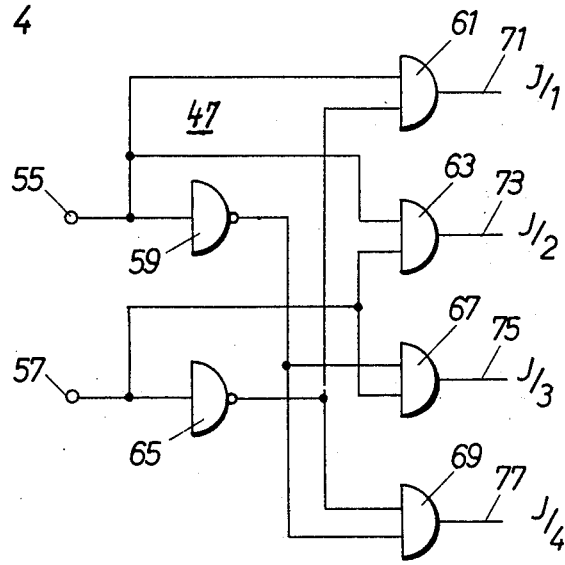
FIG. 4 illustrates the basic circuit of a part of the circuit shown in FIG. 3.

The outputs of photoelectric cells 23, 24 are, according to FIG. 4, connected with the inputs 55, 57 of input logic 47 which essentially consists of AND members and reversal stages. If necessary, known pulse shapers and the like can be connected in between the photoelectric cells 23, 24, and the input logic. According to FIG. 4, input 55 of the input logic 47 is connected with the input of a reversal stage 59 and with one, each, input of two AND members 61, 63, while input 57 is connected with the input of another reversal stage 65, one of the inputs of another AND member 67 and the other input of the AND member 63. The output of the reversal stage 59 is connected with the other input of the AND member 67 and with one input of another AND member 69, whereas the output of the reversal stage 65 is finally connected with the second inputs of the AND members 61 and 69. If the disk 11 is rotated continually or step by step, pulses will therefore appear in the output lines 71, 73, 75, and 77, which are connected with the outputs of the AND members. The form of these pulses is illustrated in the lower part of FIG. 4. The output lines 71, 73, 75, and 77 can be connected directly with the control or selection devices of the machine to be controlled.

During every period T in which each one of the K=2 photoelectric cells 23, 24 in each case scans four of the adjoining sections 1-4 of the disk 11, there will appear, in the output lines 71, 73, 75, and 77, four (2 $k$) pulses which are shifted with respect to each other in terms of time and which are periodically repeated if disk 11 continues to turn. Sections 1-4 of disk 11 have associated to them, according to FIG. 4, one, each, output line 71, 73, 75, or 77 or certain pulses which are constantly repeated in a cyclic sequence. By synchronizing the rotation of disk 11 with the work cycle of the machine we can make sure that these pulses will always appear when the control devices are ready for a control action.

The output lines 71-77 can be connected in any desired combination, for example, with the selection devices 51 of the circular knitting machine or with the control systems of any other machines. If, for example, it is desired to make sure that a special selection device 51 when passing every fourth needle, will initiate a control action (i.e., selection for knitting or not knitting), then the output line 77 of the input logic 47 will be connected with this selection device. If, on the other hand, a special selection device 51 is to influence every second and third passing needle, then output lines 73 and 75 are connected with this selection device, whereby diodes can be used for disconnection. In order to get a reproducible guide, the prerequisite here of course is that all system intervals, which are expressed in the number of needles can be divided by four between two systems or selection devices.

If on a circular knitting machine, for example, in three successive systems, which are fed, in succession, white, red, and green threads, stitches are to be formed with the color sequence green-white-white-red alternatingly in constantly recurring sequence, then the first system, which handles white, is connected with the output lines 73 and 75, the second system, which is responsible for red, is connected with the output line 77, and the third system which handles green is connected with the output line 71.

To illustrate, any relationship of four (N) stitches or four (N) successive work cycles, it is necessary to conduct a certain number, respectively, $n \leq N$ control impulses to the individual control systems or selection devices per period. For every imaginable guide of N stitches it suffices here, according to this invention, to have N pulse modes which per period P have a pulse with a duration of preferably D = T/N (see FIG. 5) and which are time-shifted toward each other if all pulses of at least one pulse mode are fed to each work station of the machine so that a number of $n$ pulses will become effective within one period T. The N (i.e. four) pulse modes can, according to FIGS. 1 and 5, be derived from $k = N/2$ (i.e. two) pulse modes which at first are generated, using $k = N/2$ scanning devices 17, 19 by scanning a single marking row (13, 15). By "pulse mode" it is meant a pulse which occurs just once within every period T, as is illustrated, for example, in FIG. 5 under 71, 73, 75, or 77.

If, for example, in a circular knitting machine the system interval expressed in the needle number cannot be divided by four, then the above mentioned connections in each case refer to different needles. In other words, if, for example, the intervals on the first white system to the second red system is 46 needles and the interval from the red system to the third green system is 45 needles and if during the first cycle of the disk 11, in which a pulse appears only in the output line 71, the needle, which at this time is in the green system is designated as the 138th needle, if the needle which at this time is in the red system is designated as the 183rd needle, and if the needle which at this time is in the white system is designated as the 299th needle, then, during this first cycle in the green system, the 138th needle would be selected, in the second cycle, in the white system, the 230th needle would be selected, in the third cycle, in the white system, the 231st needle would be selected, and in the fourth cycle, in the red system, the 186th needle would be selected. In the 48th cycle in the red system, the 230th needle which is there at this time would be selected and this needle has already knitted in the white system during the second cycle while during the 49th cycle in the green system the 186th needle would be selected and this needle has already knitted during the fourth cycle in the red system. This necessarily stems from the fact that, on the basis of the differing system interval during the first cycle, for example, the 229th needle in the first system appears not according to a number of cycle steps that can be divided by four, but rather after 46 = (11 × 4) + 2 cycle steps appears in the second system and therefore represents a "third" needle for this second system, whereas the same 229th needle after 91 = (46 + 45) = (22 × 4) + 3 cycle steps appears in the third system and consequently represents a "fourth" needle for this third system.

This disadvantage in a system interval which cannot be divided by four or in a differing system interval can be avoided according to the invention by also considering the remainder which is left when the system interval, expressed by the needle number, is divided by four. In the example given above this is accomplished for instance in the following manner; output lines 73 and 75 are arbitrarily connected with the white system while the red system is connected according to a system interval of (11 × 4) + 2 needles with the white system by means of output line 73 (instead of 77) and while the green system is finally connected according to a system interval of (22 × 4) + 3 needles with the white system to the output line 77 (instead of 71). As a result, the signals of the red system are additionally delayed by two cycle steps and the signals of the green system are additionally delayed by three cycle steps with relation to those of the white system. On the basis of this delay, the 229th needle, for example, then also represents a "first" needle in the red and green system.

In the above mentioned example (relationship: green-white-white-red) no needle is selected during the first cycle while during the second cycle the 230th needle is selected in the white system and the 184th needle is selected in the red system; during the third cycle the 231st needle is then selected in the white system and during the fourth cycle the 141st needle is then selected in the green system. During cycles 5 to 8, needles 235, 236 are accordingly selected in the white system or needle 188 is selected in the red system and needle 145 is selected in the green system. During the 47th or 51st cycle, finally, the needles 229 and 233 are selected in the red system and during the 48th and 52nd cycle in the green system the needles 185 and 189 are selected, these being the needles which in the previous systems have remained free, so that we get the desired color sequence of green-white-white-red. If we divide the needle numbers given above by four, then we furthermore find that, in the white sytem, in each case, a second and third needle is selected, in the red system in each case a fourth needle is selected, and in the green system in each case a first needle is selected. By means of the circuit described, the disadvantages due to differing system intervals are thus eliminated.

In one practical embodiment of this invention, which saves the operator the trouble of doing the mathematical figuring in case of relationship changes, a cross-bar distributor 49 is used according to this invention. The connections from the output lines 71 to 77 leading to the various knitting systems can be plugged on this distributor and its input and output lines can be so tied together that the system intervals which are determined by the machine to be controlled will be taken into consideration.

Figure 6:
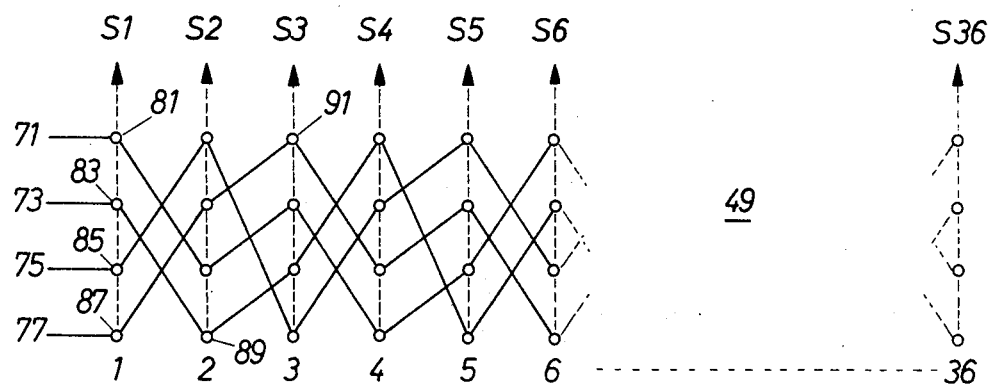
FIG. 6 illustrates the cross-bar distributor of the circuit shown in FIG. 4.

To expalin the tie-in of the cross-bar distributor 49 illustrated in FIG. 6, we start with a circular knitting machine with six systems whose system intervals alternatingly amount to 46 and 45 needles, whereby the intervals on the first system S1 to the second system S2 is 46 needles, so that, in other words, during the first cycle step, for example, needles 229, 183, 138, 92, 47, and 1 will be on the systems S1 to S6. If on each system the first passing needle is to be selected, then, for example, the system S1 must be connected with the output line 71 in accordance with the 229th = (228 + 1)th = 1st needle, the system S2 must be connected with the output line 75 according to the 185th = (184 + 1)th = 1st needle, the system S3 must be connected with the output line 77 in accordance with the 141st = (140 + 1)st = 1st needle, system S4 must be connected with output line 73 according to the 93rd = (92 + 1)rd = 1st needle, system S5 must be connected with output line 75 in accordance with the 49th = (48 + 1)th = 1st needle, and system S6 must be connected with output line 71 according to the 1st = (0 + 1)st = 1st needle. If the fourth passing needle is to knit on every system, then the output lines 77, 73, 75, 71, 73 or 77 are connected in the corresponding sequence with the systems S1 to S6. If in all system S1 to S6 the second and third needles are to be selected in each case, then all systems are connected with two, each, output lines and more specifically system S1 is connected with 73 and 75, system S2 is connected with 77 and 71, system S3 is connected with 71 and 73, system S4 is connected with 75 and 77, system S5 is connected with 77 and 71, and system S6 is connected with 73 and 75. If, finally, according to the example given earlier, every second and third needle is to be selected in system S1 if every fourth needle is to be selected in system S2, and if every first needle is to be selected in system S3 out of four, each, adjoining needles, then the system S1 is connected to the output lines 73 and 75, system S2 is connected to the output line 73, and system S3 is connected to the output line 77. As a result, the control pulses generated by the photoelectric cells 23, 24 (FIG. 1) will arrive at the control magnet systems at the particular correct moment.

In FIG. 6, there can easily be read off the tie-ins given above by way of example. Cross-bar distributor 49 is connected, on the one hand, with the output lines 71–77 and on the other hand with the control magnet systems of systems S1 to S6. The special tie-in given here only by way of example emerges from FIG. 6 to which express reference is now made in order to avoid a further description. Each one of the rails 1 to 36, drawn vertically in FIG. 6 reveals four holes (for example, 81 to 87) into which the plug pins can be inserted. By inserting a plug pin into hole 81, for example, input line 71 is connected with the control magnet system of system S1. When there is introduced one, plug pin into the holes 81 to 87, all output lines 71 to 77 are accordingly connected with the control magnet system of system S1. To disconnect the various output lines, diode plugs are used here effectively.

If, according to the example given above, the system S1 is to select every second and third needle, the system S2 is to select every fourth needle and the system S3 is to select every first needle, then plug pins are inserted into the holes 83 and 85 (connection 73, 75 with S1 for the second and third needles) as well as into hole 89 (connection of 73 with S2 for the fourth needle) and into hole 91 (connection of 77 with S3 for the first needle), as a result of which the system interval is considered automatically so that we get the correct control pulse sequence for the control magnet systems.

The rails 1 to 36 of the cross-bar distributor 49 according to FIG. 6 are then always so tied in with each other that the uppermost row of holes (for example, hole 81) must be plugged in if the pertinent systems S1 and S36 is to select in each case the first four needles. The second, third, and fourth row of holes must accordingly be plugged in for the selection of the second, third, and fourth needles in each case. When we have different system intervals or ratios of less or more stitches, then the cross-bar distributors 49 are to be altered accordingly. Every rail 1 to 36 of the cross-bar distributor has altogether N holes 81 to 87 so that any desired relationship can be selected.

This invention is not confined to the examples described here. In particular it is not necessary to generate the signal sequences, illustrated in FIG. 5, with a light barrier according to FIG. 1. To generate the signal sequences instead all imaginable pulse generators are suitable, just so long as care is taken to make sure that the pulse modes obtained are synchronized with the cycle of the machine to be controlled. In addition to the described roller and chain drives, which frequently do not permit sufficiently phase-rigid synchronization, the installations described in German Pat. No. 1,224,396 published Sept. 9, 1966 or in German Pat. No. 1,585,181 published Feb. 19, 1970 are also suitable for synchronization. In particular, a magnetic collector brush 93 can be provided on the needle cylinder 35 as cycle pulse generator and by means of this collector, the cylinder needles, indicated with the reference symbol 95, or the bars located in between can be scanned. The synchronization pulses thus obtained are conducted via suitable pulse shaper circuits 99 together with the control pulses, coming from cross-bar distributor 49, through AND members 97 so that only those parts of the relatively long control pulses can actually be used which coincide with the relatively short synchronization pulses in terms of time.

The installations just described can be used, in a corresponding modification, also directly for the generation of the pulse modes required because, for the method according to this invention, there is merely need N time-shifted control signals with the pulse forms shown in FIG. 5. Instead of the rotating disk 11 one can therefore also use endless bands with corresponding holes or disks with magnetic markings and instead of the photoelectric cells one can use electromagnets. In place of disk 11 one can furthermore directly use the needle cylinder of a circular knitting machine whose needle bars or needle channels are scanned by suitably staggered electromagnets. Furthermore, one may use an optical-electrical installation in which, according to German Pat. No. 1,585,181, the slits 13 and bars 15 are provided directly on a part firmly connected with the needle cylinder. Furthermore, there may be used a disk 11 with several rows of markings which are shifted with respect to each other and which are scanned by scanning devices arranged perpendicularly to these rows.

Finally, the invention is not confined to the idea of using only four time-shifted pulse modes according to FIG. 5. Instead, to illustrate greater ratio widths, one can also, for example, generate 6, 8, 12, 16, or N pulse modes all of which are shifted with respect to each other by about one pulse width and are preferably free of any overlap, so that, during one period there may be selected a total of 6, 8, 12, 16, or N adjacent needles in any desired fashion. To generate 6, 8, 12, 16, or N pulse modes, it suffices, by means of disk 11 and $k = N/2$ scanning devices 17, 19 or by means of any cycle pulse generators, synchronized with the machine cycle, to generate originally 3, 4, 6, 8, or $k = N/2$ pulse modes which, in each case, are shifted toward each other by the 1/k-fold of a pulse width (note upper part of FIG. 5) and from these $k$ pulse modes there can then through logical tie-in, derive $2k = N$ pulse modes which consist of pulses according to the lower part of FIG. 5. Such expansions of the method according to the imvention however are entirely up to the designer and essentially depends on the type of control desired.

Figure 7:
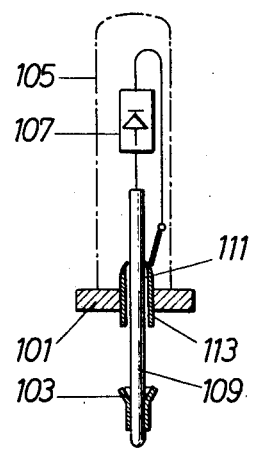
FIG. 7 illustrates a diode plug for the cross-bar distributor of FIG. 6.

One cross-bar distributor is shown by way of example in FIGS. 1 and 7. It consists of contact bars 101 and contact bushings 103 which are arranged on different planes. As can also be seen from FIG. 1, the contact bushings 103 are directly connected with the output lines 71–77 of the input logic 47 and the contact bars 101 are connected directly via AND members 97 with the selection devices 51, by means of which the cylinder needles 95 are selected for knitting or not knitting. To establish the connections between a contact bar 101 and a contact bushing 103, for example, one may use diode plugs 105 which have plug pins 109 that can be inserted into contact bushings 103, as well as shell contacts 113 which surround these plug pins 109 and which are insulated by insulating layers 111. These shell contacts 113 can be inserted into the corresponding holes in the contact bars 101. The plug pins 109 and the shell contacts 113 are connected via diodes 107 and are so spaced that they can be brought into contact simultaneously with contact bushings 103 or with contact bars 101.

Obviously the embodiments shown here are exemplary only and a wide variety of embodiments may be devised without departing from the spirit and scope thereof.

What is claimed is:
1. A circular knitting machine comprising the combination:
   a. at least one needle bed supporting knitting tools, said knitting tools being independently selectable for knitting purposes;
   b. a plurality of knitting systems having electrically controllable selection means mounted along said needle bed for selection of said knitting tools according to a desired pattern;
   c. means for generating a first relative motion between said needle bed and said knitting systems for continuously moving said knitting tools past said selection means for knitting purposes;
   d. feeding means for feeding electrical signals to said selection means during operational strokes of said knitting machine, each operational stroke being the time interval during which a knitting tool moves past a selection means or vice versa, and said feeding means including distribution means having N inputs, where N is a positive integer, and having outputs, each output being coupled to a selection means, said distribution means having connecting means for connecting each of said outputs with a preselected number of said inputs in accordance with said desired pattern; and
   e. pulse generator means having N output lines coupled to said N inputs of said distribution means and producing during knitting operations N pulse modes, each pulse mode being fed to one of said output lines and having electrical signals displaced in phase with respect to the electrical signals of all other pulse modes such that the electrical signals of each of said N pulse modes appear within another operational stroke of groups of N consecutive operational strokes, said pulse modes being produced by use of a carrier provided with markings, by at least two scanning means for scanning said carrier and for continuously producing during knitting operations at least two kinds of electrical signals being displaced in phase and by means for generating a second relative motion between said scanning means and said carrier, said second and said first relative motions being in a rigid relation.

2. A circular knitting machine comprising in combination:
   a. at least one needle bed supporting knitting tools, said knitting tools being independently selectable for knitting purposes;
   b. a plurality of knitting systems having electrically controllable selection means mounted along said needle bed for selection of said knitting tools according to a desired pattern, where the spacings between the selection means along the needle bed correspond to different numbers of knitting tools;
   c. means for generating a first relative motion between said needle bed and said knitting systems for continuously moving said knitting tools past said selection means for knitting purposes;
   d. feeding means for feeding electrical signals to said selection means during operational strokes of said knitting machine, each operational stroke being the time interval during which a knitting tool moves past a selecting means or vice versa, and said feeding means including a distribution device having N inputs, where N is a positive integer, and having outputs, each output being coupled to a selection means, said distribution means having connecting means for connecting each of said outputs with a preselected number of said inputs in accordance with said desired pattern, wherein the different spacings between said selection means along the needle bed are compensated by fixed wiring inside said distributor means in such a manner that the latter's inputs and outputs may be so connected by said connecting means as if all selection means were spaced apart by the same number of knitting tools; and
   e. pulse generator means having N output lines coupled to said N inputs of said distribution means and producing during knitting operations N pulse modes, each mode being fed to one of said output lines and having electrical signals displaced in phase with respect to the electrical signals of all other pulse modes such that the electrical signals of each of said N pulse modes appear within another operational stroke of groups of N consecutive operational strokes.

3. A circular knitting machine according to claim 1, said pulse generator means further including a circuit system the inputs of which are coupled to said scanning means and having N output lines coupled to said N inputs of said distribution means, said circuit systems consisting of logic circuitry for generating said N pulse modes by processing said pulse modes produced from said at least two scanning means.

4. A circular knitting machine as defined in claim 3, wherein said scanning means are mounted adjacent said carrier and said scanning means are spaced from each other along the markings on said carrier in such manner that they will continuously generate two pulse modes shifted in phase by 90° during scanning of the carrier, and wherein said logic-circuitry generates four pulse modes from said two pulse modes.

5. A control device as defined in claim 4, wherein said scanning means consist of photoelectric cells and said carrier is a rotatable disc having at the periphery thereof alternate slits and bars which provide the marking thereon.

6. A circular knitting machine as defined in claim 2, wherein the distribution device consists of a cross-bar distribution panel with input and output lines and wherein said connecting means consist of male plugs for the connection of said preselected input and output lines.

7. A circular knitting machine according to claim 2, wherein said first and said second relative motion is derived from the same driving means (31).

8. A circular knitting machine comprising in combination:
   a. at least one needle bed supporting knitting tools, said knitting tools being independently selectable for knitting purposes;
   b. a plurality of knitting systems having electrically controllable selection means mounted along said needle bed for selection of said knitting tools according to a desired pattern, where the spacings between the selection means along the needle bed correspond to different numbers of knitting tools;
   c. means for generating a first relative motion between said needle bed and said knitting systems for continuously moving said knitting tools past said selection means for knitting purposes;
   d. feeding means for feeding electrical signals to said selection means during operational strokes of said knitting machine, each operational stroke being the time interval during which a knitting tool moves past a selecting means or vice versa, and said feeding means including a distribution device having N inputs, where N is a positive integer, and having outputs, each output being coupled to a selection means, said distribution means having connecting means for connecting each of said outputs with a preselected number of said inputs in accordance with said desired pattern, wherein the different spacings between said selection means along the needle bed are compensated by fixed wiring inside said distributor means in such a manner that the latter's inputs and outputs may be so connected by said connecting means as if all selection means were spaced apart by the same number of knitting tools;
   e. pulse generator means having N output lines and producing during knitting operations N first pulse modes, each first pulse mode being fed to one of said output lines and having electrical signals displaced in phase with respect to the electrical signals of all other first pulse modes and having a length of an integral multiple of an operational stroke; and
   f. logic circuit means (47) having inputs coupled with the output lines of said impulse generator means and having outputs coupled to the inputs of said distribution means, said logic circuit means deriving second pulse modes from said first pulse modes, each second pulse mode being fed to one of said outputs and having electrical signals displaced in phase with respect to the electrical signals of all other second pulse modes such that the electrical signals of each of said second pulse modes appear within another operational stroke of groups of N consecutive operational strokes.

\* \* \* \* \*